United States Patent [19]

Haynes

[11] Patent Number: 4,803,876
[45] Date of Patent: Feb. 14, 1989

[54] SIGHT GLASS FOR OBSERVING LUBRICANT IN THE LOWER GEARCASE OF MARINE ENGINES

[76] Inventor: James B. Haynes, 5 Ridge Dr., Naples, Fla. 33963

[21] Appl. No.: 208,586

[22] Filed: Jun. 20, 1988

[51] Int. Cl.[4] .............................................. G01F 23/02
[52] U.S. Cl. ........................................ 73/334; 73/328; 116/276; 220/82 A; 441/135
[58] Field of Search ......................... 73/323, 325, 334; 116/276; 220/82 A; 441/135

[56] References Cited

U.S. PATENT DOCUMENTS

| | | | |
|---|---|---|---|
| 2,331,917 | 10/1943 | Kocher | 73/334 |
| 2,765,661 | 10/1956 | Thomas | 73/334 |
| 3,000,345 | 9/1961 | Gray, Jr. et al. | 73/323 |
| 3,020,795 | 2/1962 | McKinney et al. | 73/323 |
| 3,142,287 | 7/1964 | Jones | 116/276 |
| 3,556,038 | 1/1971 | Wolfe | 73/334 |
| 4,037,471 | 7/1977 | Okamoto et al. | 73/334 |
| 4,590,798 | 5/1986 | Yazaki | 73/323 |
| 4,738,064 | 4/1988 | Aarts et al. | 73/334 |

FOREIGN PATENT DOCUMENTS

| | | | |
|---|---|---|---|
| 1107409 | 11/1956 | Fed. Rep. of Germany | 73/323 |
| 690854 | 9/1930 | France | 116/276 |
| 1165332 | 9/1969 | United Kingdom | 73/323 |

Primary Examiner—William A. Cuchlinski, Jr.
Assistant Examiner—Jeffrey J. Hohenshell
Attorney, Agent, or Firm—Merrill N. Johnson

[57] ABSTRACT

Apparatus for providing a sight glass in the lower gearcase of a marine engine wherein the gearcase has a circular opening in its side. The circular opening has three concentric segments, the outermost segment has the largest diameter and is internally threaded. The center segment is sized to accomodate a disc-shaped transparent sight glass. The innermost segment has a diameter less than the center segment and the surface between the center and innermost segments contains an annular groove. An O-ring or resilient waterproof material fits into the annular groove and the disc-shaped sight glass is fitted into the center segment of the opening in the gearcase with its outer edge pressed against the O-ring. A ring-shaped window cover is then threadedly fitted into the outermost segment of the opening in the gearcase and firmly pressed against the sight glass and locked in place by a lock nut screwed into a threaded hole in the adjoining edges of the window cover and the gearcase.

2 Claims, 1 Drawing Sheet

SIGHT GLASS FOR OBSERVING LUBRICANT IN THE LOWER GEARCASE OF MARINE ENGINES

BACKGROUND AND SUMMARY OF THE INVENTION

The present invention relates to marine engines having a lower gearcase which normally operates partially submerged in water and provides an improvement in my invention set forth in my U.S. patent application Ser. No. 144,329 now U.S. Pat. No. 4,757,710.

A major source of trouble occurring with such marine engines is the entry of water into the lower gearcase, especially when the engines are operated in salt water. Water leaking into the gearcase mixes with the liquid lubricant within the gearcase and drastically reduces the lubricant's effectiveness. The water also tends to pit the surfaces of the moving metal parts of the power train and these effects eventually cause failure of the power train and costly repair and replacement of damaged parts.

Up to now the only way to guard against damages caused by the entry of water into the lower gearcase of marine engines has been to periodically take the marine engine out of the water, drain the lubricant and thus determine whether or not the lubricant has been contaminated with water. Such procedure conventionally recommended by the manufacturers of most marine engines, is both costly and time consuming. To take a medium sized sport fishing boat out of the water and check the condition of its outboard marine engine, most marinas charge in excess of $100 plus the cost of materials and supplies used.

My invention provides a sight glass or window in the side of the lower gearcase of a marine engine. The presence of even a few cubic centimeters of water mixed into the conventional liquid lubricant contained within the lower gearcase of a small outboard engine will turn the lubricant from its normally dark brown color to a milky-off white.

Thus by use of my invention the boat's owner or operator can look into the sight glass in the side of the gearcase and immediately determine by observing the color of the lubricant within the gearcase whether or not water has leaked into the lower gearcase. My sight glass permits frequent inspection of the interior of the gearcase without cost or removal of the boat from the water. It also permits prompt corrective action to be taken in the event water has entered the gearcase, thus saving expensive repairs or replacement which would have resulted if the water had remained in the gearcase for an extended period of time.

My present invention is especially designed for use by the manufacturers of marine engines. I recommend that the lower gearcase housing be cast with a circular opening having a thickness about double the usual thickness of the housing in the side of the casing. The outer edge of this hole can then be machined and threaded to accept the three elements of my sight glass assembly.

My sight glass assembly includes an O-ring, a disc-shaped sight glass and a window cover which is threaded to fit into the internally threaded circular opening in the gearcase housing. The opening in the gearcase housing contains an axially concentric groove into which is fitted the O-ring of resilient waterproof material. Then the preferably flat circular transparent sight glass is pressed against the O-ring and firmly locked into waterproof connection with the O-ring by the window cover which is pressed against the outer edge of the sight glass opposite to the outer edge of the sight glass which is pressed against the O-ring.

The window cover is threadedly joined to the gearcase housing and preferably locked into place by a lock screw threaded into a hole located in the adjoining outer edges of the gearcase housing and the window cover.

I have found the foregoing sight glass assembly to be absolutely waterproof in tests with no leakage of water into the engine's gearcase.

DETAILED DESCRIPTION OF A PREFERRED EMBODIMENT OF THE INVENTION

Figure 1:
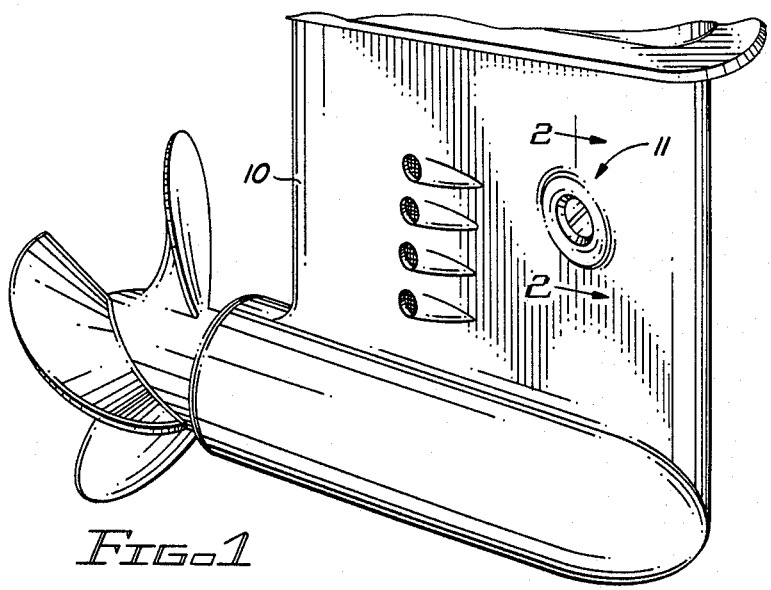
FIG. 1 is a perspective view partially broken away showing the mounting of my sight glass assembly onto the lower gearcase of an outboard marine engine.

Referring to the attached drawing, FIG. 1 shows a preferred embodiment of my sight glass assembly 11 mounted on the side of the lower gearcase 10 of an outboard marine engine.

Figure 2:
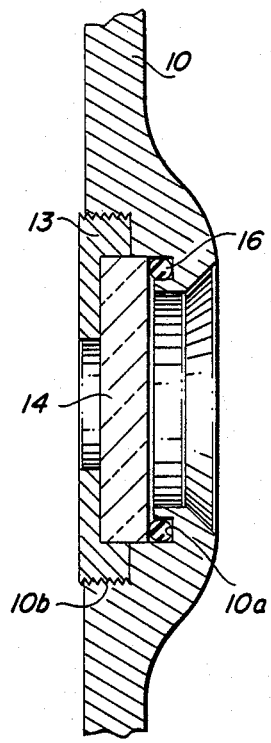
FIG. 2 is a cross-sectional side view of the sight glass assembly taken along line 2—2 of FIG. 1.
Figure 3:
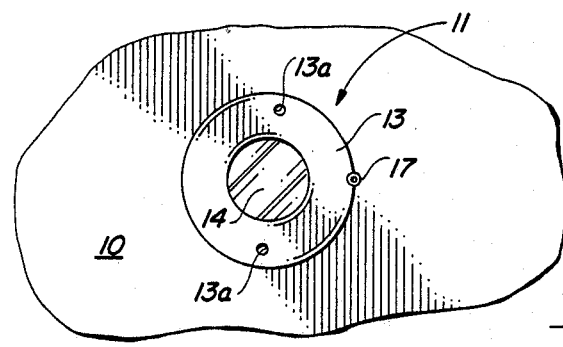
FIG. 3 is a detailed front view of the sight glass assembly shown in FIG. 1.
Figure 4:
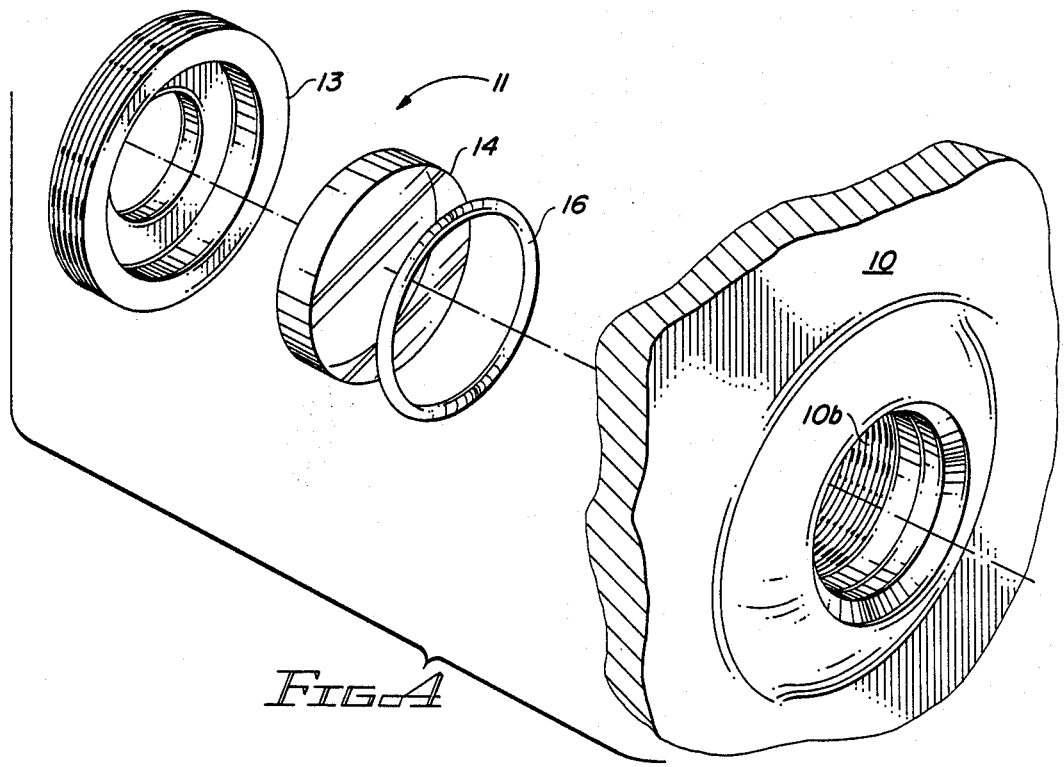
FIG. 4 is an exploded view showing in greater detail the component parts of the sight glass assembly shown in FIGS. 1, 2 and 3.

The component parts of assembly 11 are best shown in FIGS. 2, 3 and 4. Gearcase housing 10 is an aluminum casting with wall thickness of 0.15 inches except for that portion adjacent to the circular opening shown in FIG. 2 which has a wall thickness of 0.30 inches. The stepped circular hole which has been cast into the gearcase is machined to provide three concentric segments. The first stepped segment 10b of the opening has the largest diameter preferably about 1.20 inches which is internally threaded. The second or central segment has a diameter of about 0.88 inches and the third segment has a diameter of about 0.50 inches. An annular groove 10a having an outer diameter of about 0.87 inches is machined into the surface between the second and third segments of the opening as best shown in FIG. 2.

Annular groove 10a is sized to receive an O-ring 16 made of resilient water proof material. Then a disc-shaped transparent light glass 14 is inserted into the center segment of the opening in gearcase housing 10. Sight glass 14 has a diameter of about 0.87 inches and a thickness of about 0.18 inches so that one outer edge of the sight glass can be pressed against O-ring 16 positioned within annular groove 10a.

Ring-shaped window cover 13 has external threads which are designed to screw into the internal threads 10b in the opening in gearcase housing as best shown in FIG. 2. Window cover 13 has a flat annular inner face which is firmly pressed against the outer edge of sight glass 14 as window cover 13 is screwed into the opening in gearcase housing 10 to provide a waterproof seal of sight glass 14 within the gearcase.

A two-pin wrench is used to firmly position window cover 13 against sight glass 14 and to accommodate the two-pin wrench (not shown) two holes 13a are bored along a diameter of the outer face of window cover 13 as shown in FIG. 3.

Various means may be employed to lock window cover 13 into place. However, in this preferred embodiment a threaded hole is tapped into the adjoining edges of gearcase 10 and window cover 13 and a lock screw 17 as best shown in FIG. 3 is screwed into the threaded hole to maintain the two elements in fixed position.

The foregoing preferred embodiment of my invention can also be mounted on the lower gearcase of an inboard marine engine as well as on an outboard engine as shown in the drawings.

Use of my unique sight glass assembly on a marine engine, whether inboard or outboard, will substantially eliminate the damage caused to the marine engine by the entry of water into the lower gearcase, will reduce the cost of operation of marine engines and increase the enjoyment of owners of boats which employ marine engines.

While I have described and illustrated a preferred embodiment of my sight glass assembly and have described various modifications thereof, it should be understood that these descriptions are merely illustrative of my invention and are not restrictive, since the scope of my invention is limited only by the appended claims.

I claim:

1. Apparatus for providing a sight glass in the lower gearcase of a marine engine comprising
    a lower gearcase of a marine engine with a circular opening in its side, said opening having three concentric circular stepped segments each having a different diameter,
    the first segment having the largest diameter and opening to the outer surface of the gearcase being internally threaded,
    the second segment being sized to accommodate a disc-shaped transparent sight glass,
    the third segment having a diameter less than that of the second segment with the surface between the second and third segments containing an annular groove,
    an O-ring of resilient waterproof material adapted to fit into the annular groove between the second and third segments of the opening in the gearcase,
    a disc-shaped transparent sight glass having a first one of its two outer edges being pressed against the O-ring, and
    a ring shaped window cover having a flat annular face firmly pressed against the second outer edge of the sight glass and threadedly joined to the threaded segment of the opening in the gearcase.

2. Apparatus for providing a sight glass in the lower gearcase of a marine engine as set forth in claim 1 wherein the threadedly joined window cover is locked in place by a lock nut screwed into a threaded hole in the adjoining edges of the window cover and the gearcase.

* * * * *